United States Patent Office 3,666,487
Patented May 30, 1972

3,666,487
METHOD FOR TREATING PECTIN CONTAINING FRUIT JUICES USING PECTIN TRANSELIMINASE
Tamotsu Yokotsuka, Nagareyama-shi, and Shigetaka Ishii, Noda-shi, Japan, assignors to Kikkoman Shoyu Co., Ltd., Noda-shi, Japan
No Drawing. Filed Mar. 23, 1970, Ser. No. 22,004
Claims priority, application Japan, Dec. 8, 1969, 44/97,835
Int. Cl. A23l 1/02, 1/04
U.S. Cl. 99—106                                    6 Claims

ABSTRACT OF THE DISCLOSURE

Pectin transeliminase is added to a mashed product of fruits or a juice pressed from a fruit, or a filtrate thereof.

---

This invention relates to a method for treating fruit juices. More particularly, the invention pertains to a method for the treatment of fruit juices, in which by virtue of degrading pectic substances which are contained in the fruits and are eluted into the fruit juices resulted from the juicing of fruits, the fruit juices treated thereby can be improved in clarity. Alternatively the invention is directed to, in a process of manufacturing product fruit juices wherein the steps of pressing and filtering the fruits or mashed products thereof, or of filtering the pressed juices from fruits and the like can be carried out with great ease, whereby improvements in efficiencies of the pressing and filtering steps as well as in the yields of product fruit juices can be attained.

In various fruits, such as apples, grapes, citrus fruits and the like, there are contained considerable amounts of pectic substances, the elution and incorporation of which into fruit juices are caused by mashing or pressing the fruits. It has been known that the eluted pectic substances present into the fruit juice maintain the stability of the colloid system present in said juice, thereby making the said juice turbid, or because of being extremely rich in viscosity the said pectic substances make it difficult to carry out the treatments required in a process of manufacturing product fruit juices, such as steps of pressing and filtering fruits or mashed products thereof or the steps of filtering the pressed juices from friuts, thereby prolonging the operation time or lowering the yields of product fruit juices. Moreover, the pectic substance act frequently as contributory causes for a jellification during the course of operating the concentration step and the like. It has further been known that degradation of the pectic substances results in a liberation of flavor constituents and the like bonded to said pectic substances, whereby excellent flavors are imparted to the resultant fruit juices.

To accomplishing the purposes of clarifying the pressed juice from fruit, improving the pressing step of the fruit, increasing the yield of juices pressed from the fruit and preventing the formation of a jellied substance, it is necessary to degrade pectic substances contained in the fruit, and for attaining these objects under mild conditions of treatment the use of an enzyme is effective. For that reason, pectinase produced by microorganisms has principally been utilized for carrying out conventional methods for treating fruit juices.

The pectic substances referred to herein are composed mainly of polymers consisting of α-1,4-galacturonide units, which are classified into pectic acid and pectin depending on the state of the carboxyl radicals present in the galacturonic acid. The pectic acid is a polymerized product of the galacturonic acid containing free carboxyl radicals, while the pectin is that of the galacturonic acid in which the carboxyl radicals have been partially methyl esterified. The pectic substances contained in fruit juices are composed mainly of the pectin having usually about 60 to about 90% of the carboxyl radicals esterified, and they contain scarcely any pectic acid in which the carboxyl radicals have not been esterified at all.

It has heretofore been considered that two kinds of enzymes having activities entirely different from each other, i.e. esterase and glycosidase, are necessary for enzymatically degrading pectin present in fruit juices. That is, by treating with pectin esterase (hereinafter referred to as "PE") the methyl ester bond in the pectin molecule is first cleaved to yield pectic acid, and subsequently, by treating with polygalacturonase (hereinafter referred to as "PG") the α-1,4-galacturonide bond of the resultant pectic acid is cleaved. Thus, not only the degradation of pectin with PE and PG independently is hardly possible but also is entirely impossible in the case where the order of treatment with PE and PG is reversed, i.e. when PG is first allowed to react and subsequently, followed by PE.

The pectinase being used in clarifying fruit juices as well as other treatments is composed principally of PE and PG. To sufficiently accomplish these objects, it is necessary that both PE and PG be allowed to react in a well balanced state existing between the two. For instance, the proportion of methyl esterification of pectin greatly varies depending on the kind and species of fruit used or on the method of preservation of the fruit employed. It is therefore necessary to enhance the activity of PE when applied to a fruit having a high degree of esterification. In case, however, PE has a higher activity than needed, a large amount of undecomposed pectic acid is left, which tends readily to coagulate owing to the presence of an acid or metal ion such as calcium ion, magnesium ion or the like, whereby the subsequent treatments become extremely difficult to operate. For that reason, in cases where the enzymes PE and PG are used in the treatment of fruit juices, the determination of the activity ratio of PE to PG according to the kind and condition of fruit employed must receive extensive consideration.

As stated above, the use of the two kinds of enzymes is indispensable for degrading pectin. In practice, however, it is almost impossible from an industrial point of view to remove such enzymes affecting adversely fruit juices, particularly their flavor, which might be admixed with the enzymes for treatment of fruit juice, thereby purifying and recovering only the said enzymes for treatment of fruit juice. Thus, the conventional method for the treatment of fruit juice, which comprises using the two enzymes, PE and PG, in combination, involves an extreme difficulty in selecting an appropriate activity ratio of PE to PG. Moreover, it has the great drawback that the degradation of pectin with such enzyme system results in a formation of poisonous methanol by the action of PE.

Accordingly, an object of the present invention is to provide a method for treating fruit juices, which comprises cleaving directly an α-1,4-galacturonide bond of pectin having the methyl esterified carboxyl radicals with a single enzyme.

A further object of the present invention is to provide a method for degrading said pectin, which can be carried out without forming methanol in fruit juices during the course of the step of degrading said pectin.

These and other objects of the present invention will be apparent from the ensuing description and claims.

Extensive studies and investigation carried out by the present inventors on a method for directly degrading pectic substances contained in fruit juice, which may be carried out without necessitating a troublesome consideration in selecting an appropriate activation ratio of the enzymes to be employed and free from a formation of poisonous methanol during the degrading step, have resulted in the finding that pectin transeliminase (hereinafter referred to as "PTE"), which is entirely different in action and function from such pectolytic enzymes as PE and PG, will act independently and satisfactorily upon the pectin, whereby the treatment of fruit juice becomes easy, the juicing step is improved, the yield of juice pressed out of fruit is increased and the clarification of product fruit juice can be accomplished. This is ascribable to the fact that PTE reacts with an α-1,4-galacturonide bond, thereby effectively degrading the pectin.

Usually, PTE are active over a widespread pH ranging from 3 to 8, and they have in most cases an optimum pH ranging from 3.5 to 6.0, though properties of these PTE vary more or less depending on the source from which the respective PTE have been produced. The temperature at which PTE are active is from 30 to 70° C., but an optimum temperature is from 45 to 65° C. While PTE are stable in an acidic condition, particularly within the pH range of from 4 to 6, they are still relatively stable at pH values beyond the above range. As regards the thermal stability of PTE, the activities of PTE are inactivated almost completely in most cases by heat treatment at 70° C. for 10 minutes. Further, PTE's activities are hindered by the presence of a heavy metal ion such as mercury or the like, but the presence of such divalent metal ions as calcium, magnesium and the like does not hinder them.

The present method for the treatment of fruit juice comprises the step of adding PTE, in accordance with the object, to a material to be treated, such as mashed product of fruit or juice pressed from fruit, or, if necessary, crude filtrate thereof at any stage of mashing, pressing and filtering, and of treating such material with the PTE under the conditions of pH value of from 3 to 6, treatment temperature of from 40 to 60° C. and with treatment time of from scores of minutes to ten odd hours, thereby degrading pectin contained in the resulting fruit juice.

After having been treated with PTE, the resulting fruit juice is heated to inactivate the enzymatic activity of the PTE, and then solid matters contained therein are removed by centrifugal separation or filtration to give a desired clear product fruit juice. In this case, when the resulting fruit juice, after the treatment with the enzyme, i.e. after completion of the reaction, is allowed to stand for a given period of time, the separation and removal will be effected more readily.

It is also possible to facilitate the filtering operation by addition of Celite simultaneously with the addition of PTE or after the addition of PTE, to accelerate flocculation of the suspended particles by addition of protein such as gelatin or the like. Alternatively, addition of enzymes, such as cellulase, hemicellulase and the like, which are capable of playing an auxiliary role in the treatment of fruit juice, is also feasible.

An amount of the PTE added to fruit juice varies depending on the kind of fruit, the treatment temperature and the treatment time employed, and ranges widely from 20 to 2000 units/l. Although the most preferred amount of the PTE to be added depends chiefly on the conditions of treatment time and temperature employed and the treatment is preferably effected, in general, for 16 hours at 40° C., a desired clarification of fruit juice may be attained satisfactorily by the addition of PTE in an amount of from 20 to 200 units/l. in case the treatment is effected, for example, for 16 hours at 40° C.

The PTE unit referred to herein means an enzyme content capable of increasing by 1.00 a light transmission value at 235 mμ per 1 ml. of a reaction mixture, compared with a control, said reaction mixture being obtained by subjecting to incubation at 40° C. for 60 minutes a reaction liquid comprising 2 ml. of a 1% aqueous solution of pectin esterified to an extent of about 68% and McIlvaine buffer solution (pH 5.5), to which 1 ml. of a suspension containing a given amount of an enzyme has been added, and said control being obtained in the same manner as above but without being subjected to incubation.

PTE usable in the method of the present invention may be any one of those obtained from sources whatever they may be. Particularly, however, such PTE as those obtained from microorganism are preferably employed. The PTE obtained from microorganism include, for example, a PTE-containing cultured product obtained by culturing a PTE-producing microorganism, such as mold, yeast, actinomyces or the like, in a liquid or solid culture medium; a crude suspension of enzyme obtained by treating said cultured product by means of centrifugal separation, extraction or the like; an enzyme-containing precipitate obtained according to common methods for precipitating enzyme with ammonium sulfate, organic solvent or the like; a dried crude powder of enzyme obtained by drying said enzyme-containing precipitate; a purified enzyme obtained according to purifying methods such as precipitation using a precipitant, isoelectric point precipitation, dialysis, electrophoresis, molecular sieving, adsorption-desorption and ion exchange resin and so on.

Industrially advantageous supply sources of PTE include PTE-producing fungi belong to genus Aspergillus among molds, for example, yellow Aspergillus such as *Aspergillus oryzae* [e.g. *Aspergillus oryzae* 1773], *Aspergillus sojae* 48, ATCC 20235 (No. 62 Kohatsukenki) and *Aspergillus sojae* 22 (No. 63 Kohatsukenki); and black Aspergillus, for example, *Aspergillus niger* [e.g. *Aspergillus niger* 1742], *Aspergillus saitoi* [e.g. *Aspergillus saitoi* 1540], *Aspergillus inui* [e.g. *Aspergillus inui* 05 (No. 64 Kohatsukenki)], *Aspergillus aureus* [e.g. *Aspergillus aureus* 1740], *Aspergillus awamori* [e.g. *Aspergillus awamori* 1780, *Aspergillus usami* 1531], *Aspergillus japonicus* [e.g. *Aspergillus japonicus* 1744, ATCC 20236], and the like.

Particularly excellent as the supply sources of PTE used in the present invention, are *Aspergillus sojae* 48, ATCC 20235 belonging to yellow *Aspergillus* and *Aspergillus japonicus* 1744, ATCC 20236 belonging to black Aspergillus.

A procedure for obtaining PTE by use of these microorganisms will be illustrated in brief below. The microorganism selected is cultured in a solid or liquid culture medium adjusted to pH 3.0–7.0 at about 20 to about 40° C. for about 2 to about 7 days, said medium containing carbon source, nitrogen source and other components necessary for the growth of the microorganism. Where a solid medium is employed, the resulting cultured product is extracted with a suitable solvent, such as water or the like, and the extract centrifuged to separate microbial cells, whereby a transparent crude suspension of enzyme is obtained, and where a liquid medium is employed, the resulting cultured product as such as centrifuged to separate microbial cells, whereby a transparent crude suspension of enzyme is obtained. When the PTE-containing suspension thus obtained is charged with ammonium sulfate in an amount necessary for attaining a 60–70% saturation or with an organic solvent, such as acetone, alcohol or the like, in an amount necessary for attaining a 50–75% concentration, impurities soluble in said solvents at the respective concentration as ranged above can be fractionated to give a concentrated PTE.

Examples of fruit juices treatable in the method of the present invention include, for example, pressed out or water-extracted juices of fruits, such as apples, grapes, citrus fruits, apricots, quinces, peaches, pears, plums and the like, and, in addition thereto, pressed out juices or water-extracts, such as vegetable juice or the like, of pectin-containing vegetable products.

Further, the present method is also applicable to common salt- or alcohol-containing fruit juices besides common fruit juices mentioned above.

According to the method of the present invention, because pectin can be degraded by use of a single enzyme as stated above, the pectin contained in fruit juice is degraded promptly without necessitating any intricated operations and also free from the formation of poisonous methanol, whereby the objects of the present invention, such as clarification of a product fruit juice, improvement in juicing step, increase in a yield of juices pressed out of fruit and so on, can be accomplished. It may be said therefore that the present invention is unparalleled in the field of art, to which the treatment method of fruit juice belongs.

The method of the present invention will be illustrated in detail with reference to the following examples.

EXAMPLE 1

A cultured product (Koji) obtained by solid-culturing *Aspergillus sojae* 48 ATCC 20235 in wheat bran for two or three days was extracted with 5 times as much water, and the extract was then centrifuged to give a transparent crude enzyme-suspension. A precipitate formed by addition to said enzyme-suspension of ammonium sulfate in an amount necessary for attaining a 40% saturation was removed. Subsequently, a precipitate formed by addition of ammonium sulfate in an amount necessary for attaining a 75% saturation to a supernatant liquid of said enzyme-suspension was collected by centrifugal separation. The precipitate thus collected was dissolved in a small amount of distilled water and the solution was passed through a column (2 x 140 cm.) packed with Sephadex G–25 to remove the ammonium sulfate, and then an eluded fraction of enzyme protein was lyophilized to enzyme powder. The enzyme powder was dissolved in 0.01 M acetate buffer solution adjusted to pH 4.0, and adsorption was effected by means of a column packed with CM-cellulose, said column being equilibrated with said buffer solution. PTE absorbed to the column was eluted with 0.1 M acetate buffer solution adjusted to pH 5.0. After repeating this operation, the eluted fractions of PTE were collected and concentrated. Subsequently, the gel formed was filtered off using a column packed with Sephadex G–100. In this manner, there was obtained a ultra-centrifugally and electrophoretically homogeneous purified PTE that is absolutely free from other enzymes than PTE.

One (1) litre of apple (species: Jonathan) juice was treated with 150 units (protein content: 0.5 mg.) of the purified PTE obtained according to the above method at 40° C. for 60 minutes. Thereafter, the enzyme-reaction was stopped by heat treatment. The reaction product was cooled and then centrifuged at 3000 r.p.m. for 5 minutes to give an extremely clarified apple juice having a light transmission value of 97.00 at 660 m$\mu$. On the other hand, a control treated, without addition of the enzyme, in the same manner as above failed completely to give a clear apple juice.

EXAMPLE 2

Thirty (30) units of purified PTE obtained according to exactly the same procedure as in Example 1 was added to 100 ml. of grape (species: Delaware) juice. After the reaction at 50° C. for 30 minutes, the reaction product obtained thereby was then treated in the same manner as in Example 1 to give a clarified grape juice having a light transmission value of 96.5 at 660 m$\mu$. A control treated without addition of the enzyme in the same procedure as above, however, failed to give a clear grape juice.

EXAMPLE 3

A cultured product (Koji) obtained by culturing *Aspergillus aureus* 1740 in wheat bran was extracted with 5 times as much water, and the extract was centrifuged to give a transparent crude enzyme. A precipitate formed by charging the crude enzyme, while cooling and stirring, with 5 times as much cold ethanol was collected. The precipitate was lyophilized to give a crude PTE powder.

One (1) litre of apple (species: Golden Delicious) juice was treated with 100 mg. (PTE content: 400 units) of the above crude PTE powder at 60° C. for 60 minutes, and was centrifuged, after the heat treatment, to give a clear apple juice having a light transmission value of 94.5 at 660 m$\mu$.

EXAMPLE 4

A cultured product (Koji) obtained by culturing *Aspergillus inui* 05 in a mixed medium comprising wheat bran and rice bran for 3 days was dried and then ground. One (1) litre of mandarin (species: Unshu) juice was treated with 2 g. (PTE content: 724 units) at 40° C. for 18 hours to give a clear mandarin juice.

EXAMPLE 5

One (1) litre of a mashed product of grape (species: Koshu) was treated at 40° C. for 4 hours with stirring at intervals with 100 mg. (PTE content: 1250 units) of an enzyme obtained from a cultured product of *Aspergillus japonicus* 1744 ATCC 20236 by salting out with ammonium sulfate. After completion of the treatment, the reaction product was filtered using Celite. Comparing with a control treated without addition of the enzyme, the filtration was completed more promptly and 655 ml. of a clear grape juice was obtained showing an increase of 40% in the yield.

EXAMPLE 6

Twenty (20) mg. (PTE content: 94.4 units) of an enzyme obtained from a cultured product of *Aspergillus sojae* 48 ATCC 20235 by salting out using ammonium sulfate was added to 500 ml. of pear (species: Nijusseiki) juice, and the mixture was treated at 40° C. for 20 minutes to give a clear pear juice.

What we claim is:

1. A method for treating pectin containing fruit juice, which comprises adding pectin transeliminase to a mashed product of fruit or a juice pressed from fruit, or a filtrate thereof and reacting the resulting mixture for a period of time sufficient to degrade the pectin contained therein while the said mixture is adjusted to pH 3–6 and the treatment temperature is 40–60° C.

2. A method according to claim 1, wherein the pectin transeliminase is used in an amount of 10–2000 units per 1 litre of the mashed product of fruit or a juice pressed from fruit, or a filtrate thereof.

3. A method according to claim 1, wherein the pectin transeliminase is obtained from a fungus microorganism.

4. A method according to claim 3, wherein the microorganism is *Aspergillus sojae* ATCC 20235.

5. A method according to claim 3, wherein the microorganism is *Aspergillus japonicus* ATCC 20236.

6. A method according to claim 1 wherein the pectin transeliminase is the sole enzyme.

References Cited

UNITED STATES PATENTS

| | | | |
|---|---|---|---|
| 1,932,833 | 10/1933 | Willaman | 99—106 |
| 3,347,678 | 10/1967 | Villadsen et al. | 99—105 X |

OTHER REFERENCES

Chemical Abstracts, 61:4643c (1964).
Chemical Abstracts, 61:13569d (1964).
Chemical Abstracts, 62:4266h (1965).
Chemical Abstracts, 64:965f (1966).

S. LEON BASHORE, Primary Examiner

F. FREI, Assistant Examiner

U.S. Cl. X.R.

99—100 R, 103